(12) United States Patent
Joo

(10) Patent No.: US 10,105,760 B2
(45) Date of Patent: Oct. 23, 2018

(54) CUTTING TOOL ASSEMBLY AND SHANK

(71) Applicant: TaeguTec Ltd., Gachang-myeon, Dalseong-gun, Daegu (KR)

(72) Inventor: Jang Hyuk Joo, Daegu (KR)

(73) Assignee: TaeguTec Ltd., Dalseong-gun, Daegu (KR)

( * ) Notice: Subject to any disclaimer, the term of this patent is extended or adjusted under 35 U.S.C. 154(b) by 212 days.

(21) Appl. No.: 15/035,412

(22) PCT Filed: Nov. 18, 2014

(86) PCT No.: PCT/KR2014/011073
§ 371 (c)(1),
(2) Date: May 9, 2016

(87) PCT Pub. No.: WO2015/080418
PCT Pub. Date: Jun. 4, 2015

(65) Prior Publication Data
US 2016/0288216 A1    Oct. 6, 2016

(30) Foreign Application Priority Data
Nov. 29, 2013  (KR) .......................... 10-2013-0147116

(51) Int. Cl.
*B23B 27/16*    (2006.01)
(52) U.S. Cl.
CPC .. *B23B 27/1662* (2013.01); *B23B 2200/0452* (2013.01); *B23B 2205/04* (2013.01); *B23B 2205/16* (2013.01)
(58) Field of Classification Search
CPC ........ B23B 27/1662; B23B 2200/0452; B23B 2205/04; B23B 2205/16; B23B 29/04;
(Continued)

(56) References Cited

U.S. PATENT DOCUMENTS 3,280,450 A * 10/1966 Sirola ................. B23B 27/1662
407/104
3,314,126 A *  4/1967 Stier .................... B23B 27/1622
407/105
(Continued)

FOREIGN PATENT DOCUMENTS

CN        1872462 A      12/2006
CN        2936504 Y       8/2007
(Continued)

OTHER PUBLICATIONS

Extended European Search Report dated Jul. 6, 2017, issued in counterpart European application (No. EP 14865930.3).
(Continued)

*Primary Examiner* — Sara Addisu
(74) *Attorney, Agent, or Firm* — Womble Bond Dickinson (US) LLP

(57) ABSTRACT

A cutting tool assembly includes a shank, a shim, a cutting insert, a clamping lever and a set screw. The shank has an insert pocket with a base wall, a lever receiving portion and a screw hole. The shim is disposed on the base wall of the insert pocket and has a shim bore. The cutting insert is disposed on the upper surface of the shim and has an insert bore. The clamping lever is received in the lever receiving portion and clamps the cutting insert to the insert pocket. The clamping lever has first and second extension portions. The set screw is fastened to the screw hole and has a screw head, a threaded portion and an engaging groove. The engaging groove of the set screw engages the second extension portion. The shim includes an avoiding portion for avoiding an interference with the screw head.

20 Claims, 7 Drawing Sheets

(58) Field of Classification Search
CPC ..... B23B 2200/0428; B23B 2200/0447; Y10T 407/2282; Y10T 407/229
See application file for complete search history.

(56) References Cited

U.S. PATENT DOCUMENTS

| | | | | |
|---|---|---|---|---|
| 3,316,616 A * | 5/1967 | Milewski | ............ | B23B 27/1677 407/105 |
| 3,355,786 A * | 12/1967 | Hargreaves | ......... | B23B 27/1651 407/104 |
| 3,393,435 A * | 7/1968 | Viellet | ................ | B23B 27/1662 407/105 |
| 3,777,341 A * | 12/1973 | Faber | .................. | B23B 27/1614 407/114 |
| 3,792,516 A * | 2/1974 | Mihic | ................. | B23B 27/1677 407/105 |
| 3,848,303 A * | 11/1974 | Faber | .................. | B23B 27/1614 407/105 |
| 3,889,332 A * | 6/1975 | Mihic | ................. | B23B 27/1677 407/101 |
| 3,902,232 A * | 9/1975 | Hertel | ..................... | B23B 27/08 407/104 |
| 3,906,602 A * | 9/1975 | Kummer | ............. | B23B 27/1662 407/105 |
| 3,908,255 A * | 9/1975 | Faber | .................. | B23B 27/1651 407/105 |
| 3,973,309 A * | 8/1976 | Kummer | ............. | B23B 27/1662 407/104 |
| 4,632,593 A * | 12/1986 | Stashko | ............. | B23B 27/1622 403/11 |
| 6,526,814 B1 * | 3/2003 | Kataoka | ................ | B23B 27/141 73/104 |
| 6,599,060 B2 * | 7/2003 | Hecht | ................. | B23B 27/1662 407/102 |
| 7,063,488 B2 * | 6/2006 | Isaksson | ............. | B23B 27/1614 407/108 |
| 2004/0081521 A1 * | 4/2004 | Erickson | ............. | B23B 27/1677 407/102 |
| 2007/0086863 A1 * | 4/2007 | Tipu | .................... | B23B 27/1662 407/104 |
| 2008/0152441 A1 | 6/2008 | Andersson et al. | | |
| 2011/0211923 A1 * | 9/2011 | Yoffe | .................. | B23B 27/1662 407/110 |
| 2011/0274507 A1 * | 11/2011 | Park | .................... | B23B 27/1662 407/104 |
| 2012/0082522 A1 * | 4/2012 | Hecht | ................. | B23B 27/1677 407/105 |
| 2013/0121776 A1 | 5/2013 | Majima | | |

FOREIGN PATENT DOCUMENTS

| | | | | |
|---|---|---|---|---|
| EP | 0161505 A1 * | 11/1985 | ......... | B23B 27/1622 |
| GB | 1146887 | 3/1969 | | |
| JP | 52018283 A * | 2/1977 | | |
| JP | 02180509 A * | 7/1990 | ......... | B23B 27/1662 |
| JP | 2556470 | 8/1997 | | |
| JP | 2581630 | 7/1998 | | |
| JP | 2004148496 A * | 5/2004 | ......... | B23B 27/1677 |
| JP | 2005-186214 | 7/2005 | | |
| JP | 2009-113185 | 5/2009 | | |
| JP | 2015139839 A * | 8/2015 | | |

OTHER PUBLICATIONS

International Search Report dated Feb. 2, 2015 issued in counterpart International (PCT) Application (No. PCT/KR2014/011073).

* cited by examiner

[Fig. 1]
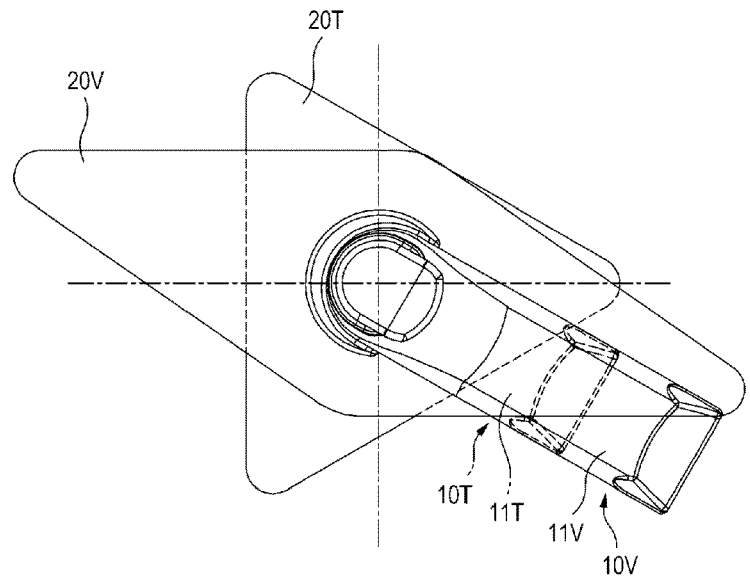
(PRIOR ART)
[Fig. 2]
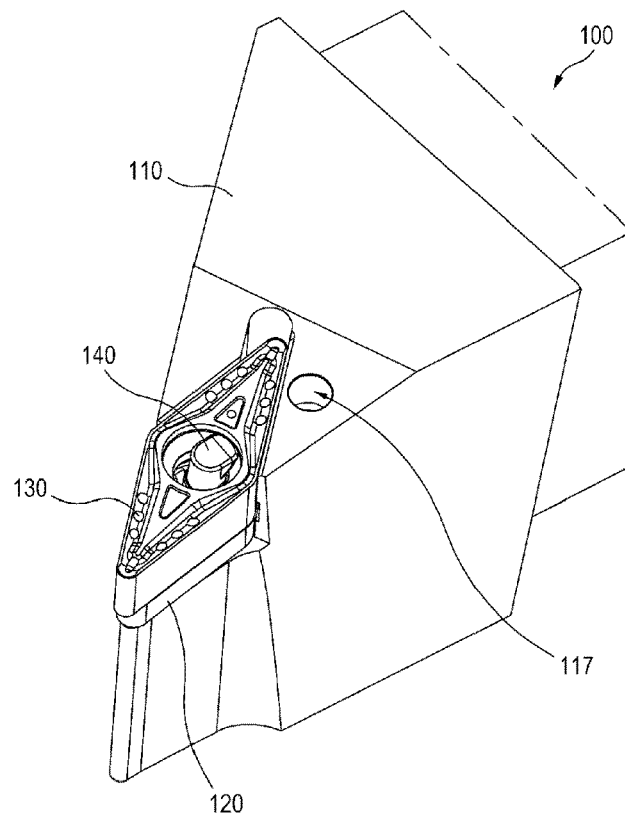

[Fig. 3]
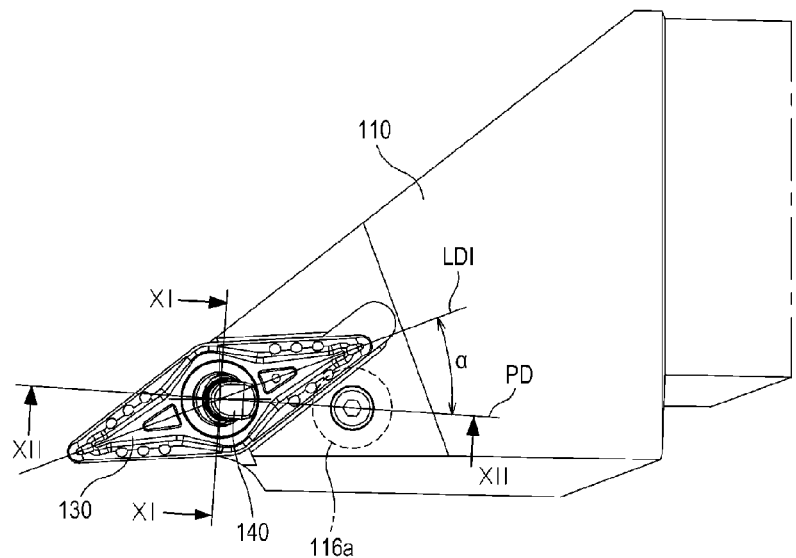
[Fig. 4]
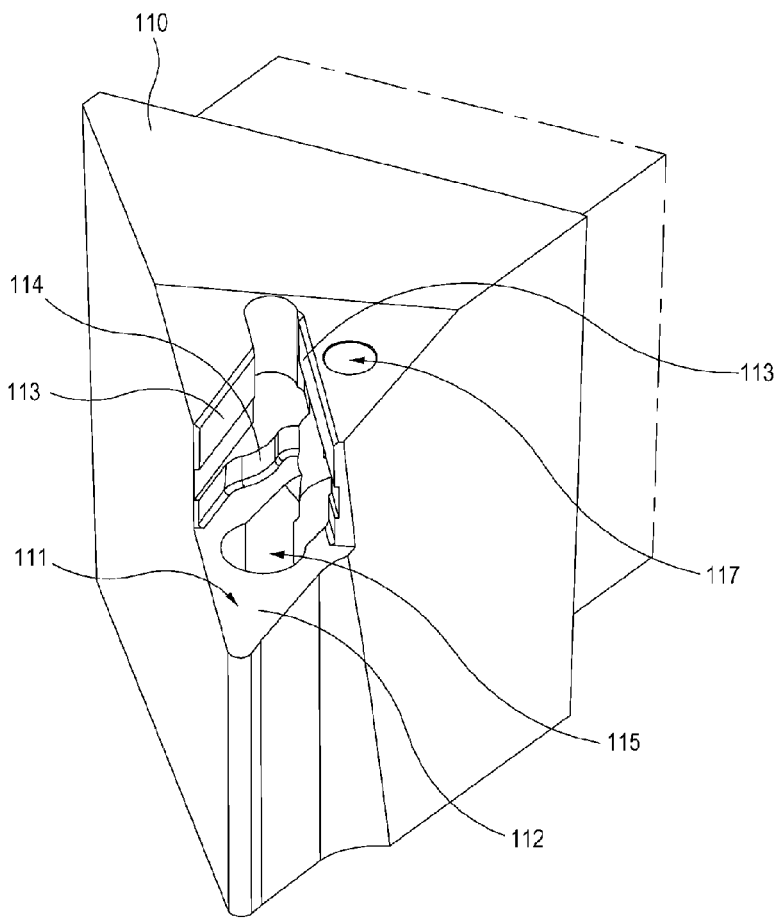

[Fig. 5]
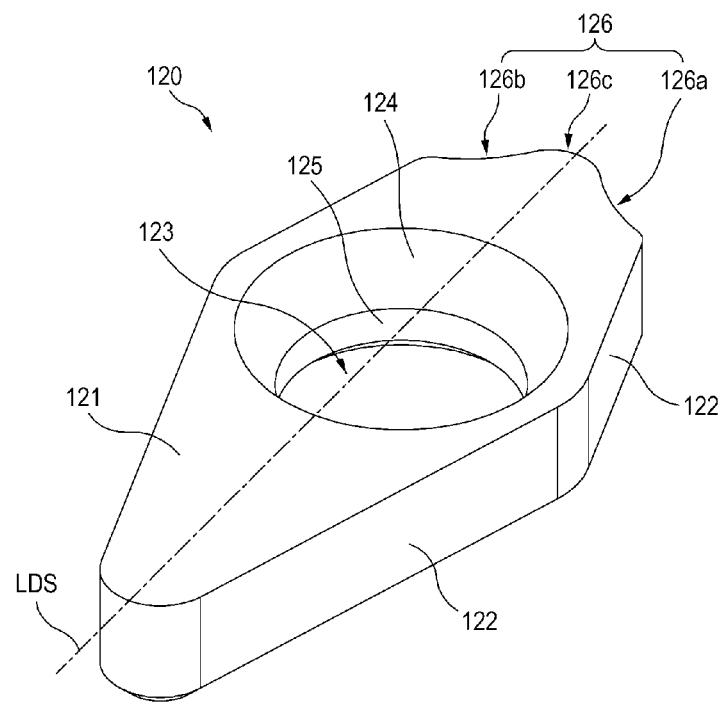
[Fig. 6]
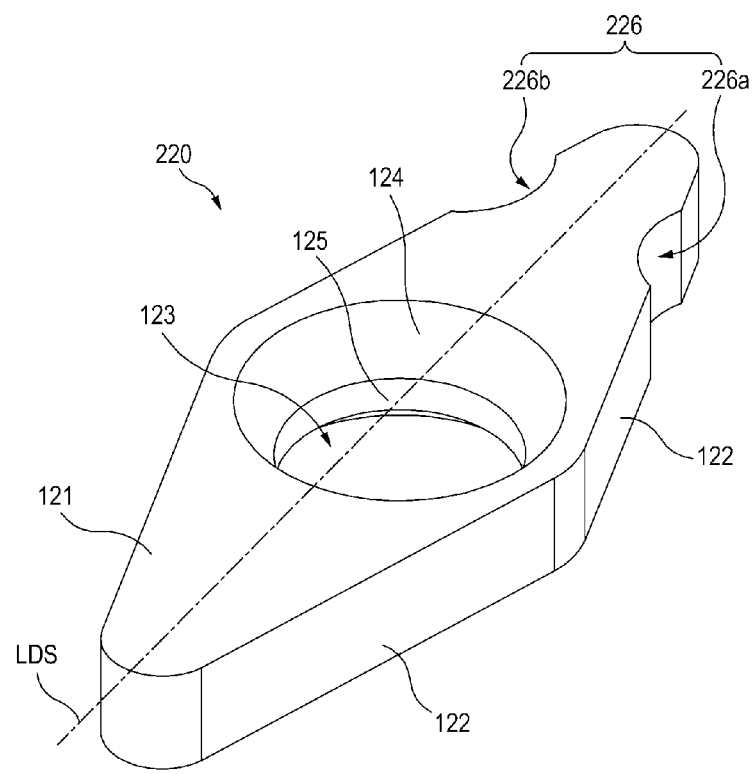

[Fig. 7]
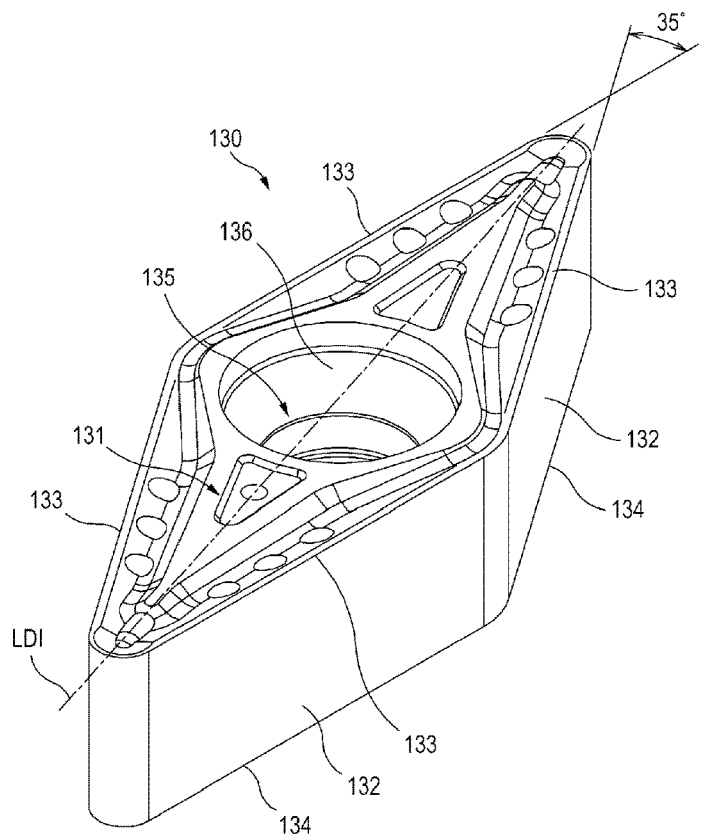
[Fig. 8]
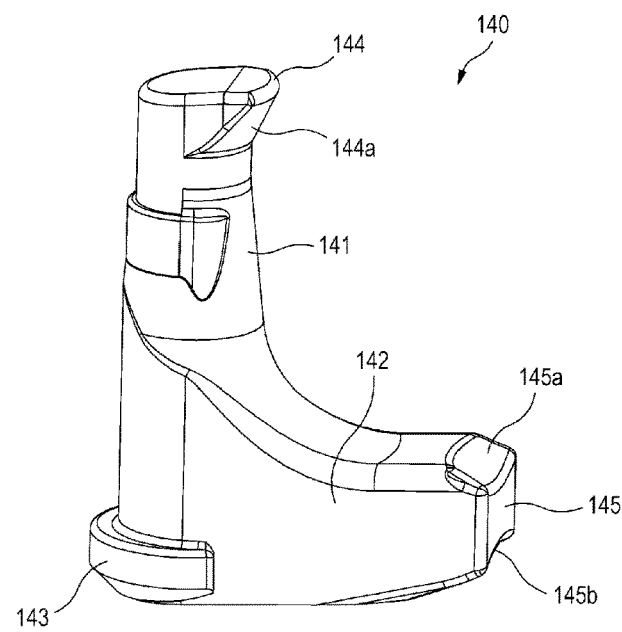

[Fig. 9]
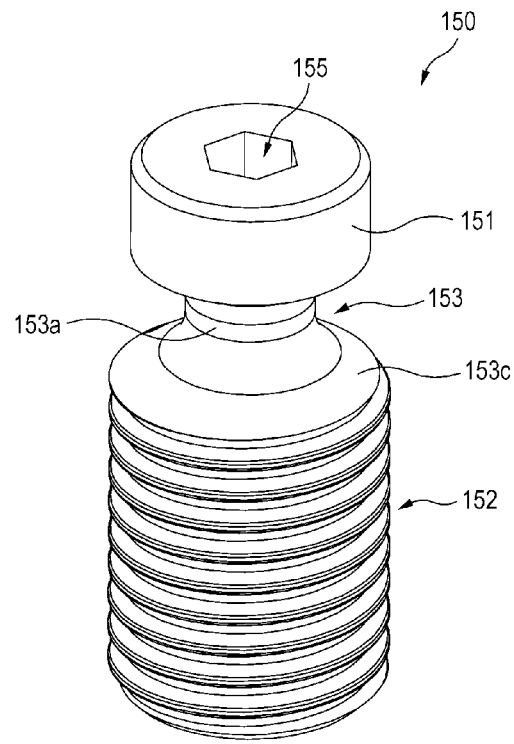
[Fig. 10]
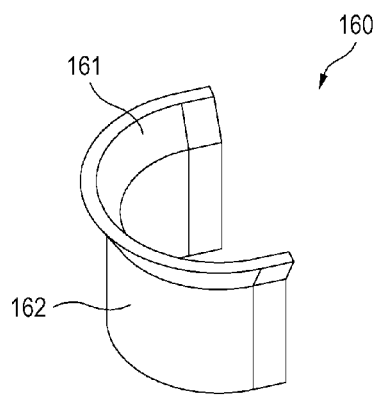

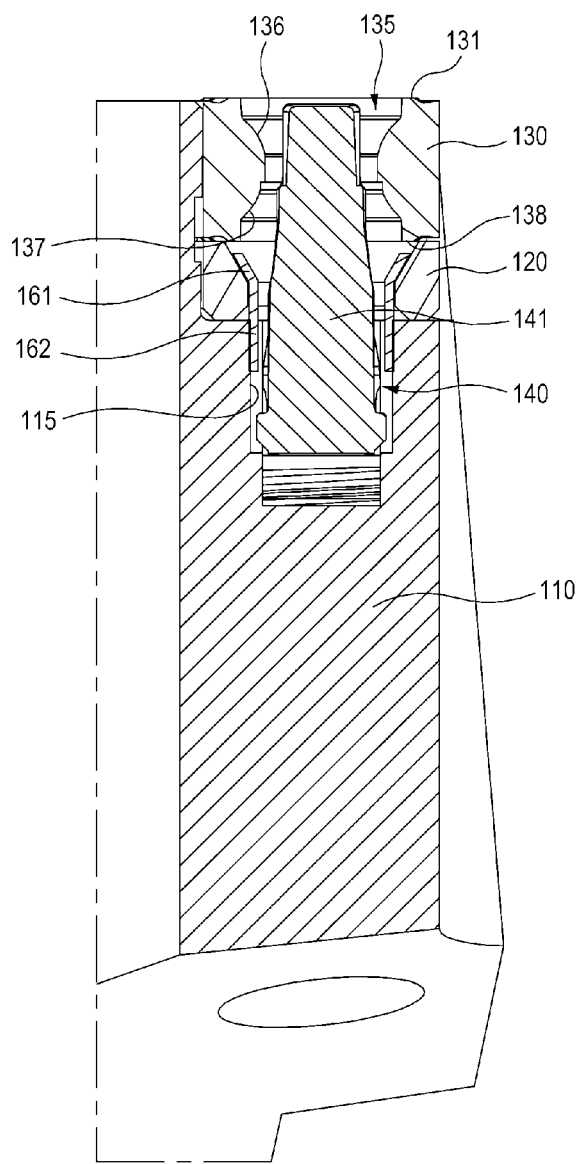
[Fig. 11]

[Fig. 12]
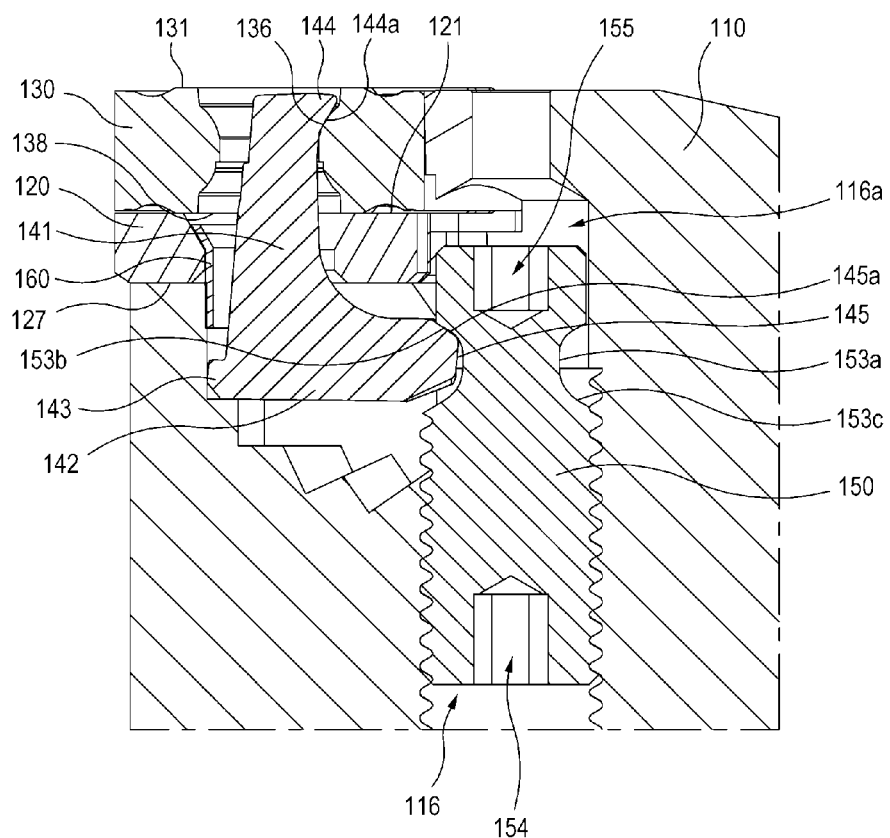

CUTTING TOOL ASSEMBLY AND SHANK

RELATED APPLICATIONS

This is a 35 USC 371 U.S. National Phase of International Application No. PCT/KR2014/011073, filed 2014 Nov. 18 and published as WO 2015/080418A1 on 2015 Jun. 4, which claims priority to Korean application no. 10-2013-0147116, filed 2013 Nov. 29. The contents of the aforementioned applications are incorporated by reference in their entirety.

TECHNICAL FIELD

The present invention relates to a cutting tool assembly including a V-type cutting insert and a clamping lever. Further, the present invention relates to a shank of such cutting tool assembly.

BACKGROUND ART

A technique using a lever, which clamps a cutting insert to a shank, is well known in the art. According to the International Organization for Standardization (ISO), the cutting insert may be expressed by alphabetic characters, which are predetermined in accordance with a planar shape of the cutting insert. For example, a cutting insert of an equilateral triangle is referred to as a T-type cutting insert, a cutting insert of a square is referred to as an S-type cutting insert, and a cutting insert having an included angle of 35 degrees is referred to as a V-type cutting insert.

FIG. 1 is shows a conventional T-type cutting insert and a T-type lever therefor, as well as a conventional V-type cutting insert and a V-type lever therefor. Referring to FIG. 1, the T-type lever 10T clamps the T-type cutting insert 20T to a shank, while the V-type lever 10V clamps the V-type cutting insert 20V to the shank. The T-type and V-type levers 10T, 10V have extension portions 11T, 11V extending parallel to the cutting insert. Since a length of the V-type cutting insert 20V is longer than a length of the T-type cutting insert 20T, the extension portion 11V of the V-type lever 10V is formed longer than the extension portion 11T of the T-type lever 10T. However, the longer extension portion 11V weakens the strength of the extension portion 11V under the same clamping force. Thus, the V-type lever 10V may be bent or broken by a clamping force required during a cutting operation. This may result in a weakened clamping force of the V-type lever 10V with respect to the V-type cutting insert 20V. There is a demand for developing a cutting tool assembly that resolves such problems and allows for fast and secure clamping of the V-type cutting insert by the lever.

DISCLOSURE OF INVENTION

Technical Problem

The present invention is directed to solving the aforementioned problems. The present invention provides a cutting tool assembly wherein a clamping lever is capable of fast and securely clamping a V-type cutting insert. Further, the present invention provides a shank of such cutting tool assembly.

Solution to Problem

One aspect of the present invention provides a cutting tool assembly. A cutting tool assembly according to an exemplary embodiment of the present invention includes a shank, a shim, a cutting insert, a clamping lever and a set screw. The shank includes: an insert pocket formed from a top and having a base wall; a lever receiving portion formed downwardly from the base wall; and a screw hole disposed perpendicularly to the base wall and formed from a bottom. The shim is disposed on the base wall of the insert pocket. The shim includes a shim bore extending through centers of an upper surface and a lower surface. The cutting insert is disposed on the upper surface of the shim and has a rhombus shape. The cutting insert includes: an upper surface; a lower surface; a plurality of side surfaces located between the upper surface and the lower surface; and an insert bore extending through centers of the upper face and the lower surface. The clamping lever is received in the lever receiving portion. The clamping lever includes: a first extension portion disposed perpendicularly to the base wall of the insert pocket; and a second extension portion extending from a lower end of the first extension portion parallel to the base wall of the insert pocket. The set screw is fastened to the screw hole. The set screw includes: a screw head located upward; a threaded portion located downward; and an engaging groove located between the screw head and the threaded portion and engaging a front end of the second extension portion. The shim includes an avoiding portion configured to avoid an interference with the screw head.

In one embodiment, the avoiding portion includes: a pair of concave surfaces located at a portion in a longitudinal direction of the shim and formed opposite each other in a side surface of the shim; and a convex surface located between the pair of concave surfaces.

In one embodiment, the upper surface and the lower surface of the shim have a rhombus shape. The avoiding portion includes a pair of concave portions located at a portion in a longitudinal direction of the shim and formed opposite each other in a side surface of the shim.

In one embodiment, the first extension portion includes a clamping head protruding in the same direction as the second extension portion. The insert bore includes an inclined inner peripheral surface having a diameter decreasing from the upper surface of the cutting insert toward the lower surface of the cutting insert. The clamping head includes an inclined pressing surface inclined downwardly from an upper end of the clamping head.

In one embodiment, the second extension portion includes an engaging portion formed at a front edge of the second extension portion and engaging the engaging groove of the set screw. The engaging portion includes: a first inclined engaging surface inclined downwardly from a top of the second extension portion; and a second inclined engaging surface inclined upwardly from a bottom of the second extension portion. The engaging groove includes: a first tapered portion contacting the first inclined engaging surface and having a diameter decreasing downwardly from the screw head; and a second tapered portion contacting the second inclined engaging surface and having a diameter decreasing upwardly from the threaded portion.

In one embodiment, the cutting tool assembly further includes a shim pin passing through the shim bore and being fitted to the lever receiving portion. The shim bore includes an inclined portion having a diameter decreasing downwardly from the upper surface of the shim. The shim pin includes: an inclined portion engaging the inclined portion of the shim bore and having a diameter decreasing downwardly from above; and an extension portion extending from a lower end of the inclined portion of the shim pin with a uniform diameter. The extension portion of the shim pin passes through the shim bore and is fitted to the lever receiving portion.

In one embodiment, the screw hole includes an axial extension portion at which the screw head is positioned. The axial extension portion partially overlaps with the base wall of the insert pocket.

In one embodiment, the clamping lever includes a supporting portion protruding in a direction opposite to an extending direction of the second extension portion at a position where the first extension portion and the second extension portion are interconnected.

A cutting tool assembly according to another exemplary embodiment includes a shank, a cutting insert, a clamping lever and a set screw. The shank includes: an insert pocket formed from a top and having a base wall; a lever receiving portion formed downwardly from the base wall; and a screw hole disposed perpendicularly to the base wall and formed from a bottom. The cutting insert is disposed on the base wall of the insert pocket and has a rhombus shape. The clamping lever is received in the lever receiving portion. The clamping lever includes: a first extension portion disposed perpendicularly to the base wall of the insert pocket; and a second extension portion extending from a lower end of the first extension portion parallel to the base wall of the insert pocket. The set screw is fastened to the screw hole. A portion of the set screw overlaps with a portion of the cutting insert when the shank is viewed from top. The set screw is fastened to the screw hole from the bottom of the shank.

In one embodiment, the cutting tool assembly further includes a shim disposed between the base wall of the insert pocket and the cutting insert.

Another aspect of the present invention provides a shank of a cutting tool assembly. A shank according to an exemplary embodiment includes an insert pocket, a lever receiving portion and a screw hole. The insert pocket is formed from a top and has a base wall. The lever receiving portion is formed downwardly from the base wall and receives an L-shaped clamping lever. A set screw is fastened to the screw hole. The screw hole is disposed perpendicularly to the base wall and formed from a bottom. The screw hole is located below the base wall of the insert pocket. A portion of the screw hole overlaps with a portion of the insert pocket when the shank is viewed from top.

In one embodiment, the insert pocket includes lower side walls contacting side surfaces of a shim. The lower side wall includes a convex surface protruding toward the side surface of the shim.

Advantageous Effects of Invention

According to the cutting tool assembly, the cutting insert is clamped to the insert pocket by the clamping lever and the shim includes the avoiding portion configured to avoid the interference with the screw head. Thus, the distance from the center of the insert bore of the cutting insert to the screw hole can be reduced. Accordingly, the cutting insert can be fast and securely clamped or fast and easily unclamped by using the clamping lever without weakening the strength of the clamping lever. Further, the cutting tool assembly does not need a separate clamping device that is provided on the top of the shank or the cutting insert. This makes it possible to provide another device (e.g., cooling device) on the top of the shank or the cutting insert.

The set screw is disposed so as to overlap with the cutting insert at least partially when the cutting tool assembly is viewed from top, while the set screw is fastened to the screw hole from the bottom of the shank. Thus, the distance from the center of the cutting insert to the screw hole can be reduced. Accordingly, the cutting insert can be fast and securely clamped or fast and easily unclamped by using the clamping lever without weakening the strength of the clamping lever.

BRIEF DESCRIPTION OF DRAWINGS

FIG. 1 is schematically shows a conventional T-type cutting insert and a clamping lever therefor, as well as a conventional V-type cutting insert and a clamping lever therefor.

FIG. 2 is a perspective view showing a cutting tool assembly according to one embodiment.

FIG. 3 is a top view of the cutting tool assembly shown in FIG. 2.

FIG. 4 is a perspective view showing a shank shown in FIG. 2.

FIG. 5 is a perspective view showing a shim shown in FIG. 2.

FIG. 6 is a perspective view showing a shim according to another example.

FIG. 7 is a perspective view showing a V-type cutting insert shown in FIG. 2.

FIG. 8 is a perspective view showing a clamping lever shown in FIG. 2.

FIG. 9 is a perspective view showing a set screw of a cutting tool assembly according to one embodiment.

FIG. 10 is a perspective view showing a shim pin of a cutting tool assembly according to one embodiment.

FIG. 11 is a sectional view taken along the line XI-XI in FIG. 3.

FIG. 12 is a sectional view taken along the line XII-XII in FIG. 3.

MODE FOR THE INVENTION

Descriptions will be made as to embodiments of a cutting tool assembly with reference to the accompanying drawings. Like or corresponding components in the drawings are denoted by the same reference numeral.

Referring to FIGS. 2 and 12, a cutting tool assembly 100 according to one embodiment includes a shank 110, a shim 120, a cutting insert 130, a clamping lever 140 and a set screw 150.

The shank 110 is connected to a tool body (not shown) at its rear end. The cutting insert 130 is mounted on a front end of the shank 110. As shown in FIG. 4, an insert pocket 111, which is configured to receive the shim 120 and the cutting insert 130, is formed at a front end corner of the shank 110. The insert pocket 111 is formed downwardly from a top of the shank 110 and is recessed downwardly from the top of the shank 110. The insert pocket 111 includes: a base wall 112; upper side walls 113 contacting side surfaces 132 of the cutting insert 130; and lower side walls 114 contacting side surfaces 122 of the shim 120. The base wall 112 is formed flat. A lever receiving portion 115 for receiving the clamping lever 140 is formed in the base wall 112 downwardly from the base wall 112. The upper side walls 113 are flat to correspond to the shape of the side surfaces 132 of the cutting insert 130. The lower side walls 114 include a plurality of curved surfaces, which correspond to the shape of the side surfaces 122 of the shim 120.

The shank 110 includes a screw hole 116 (see FIG. 12) to which the set screw 150 is fastened. The screw hole 116 is disposed perpendicularly to the base wall 112 of the insert pocket 111. The screw hole 116 is formed upwardly from a bottom of the shank 110. The screw hole 116 is configured such that the set screw 150 is inserted to the screw hole 116 from the bottom of the shank 110, thus minimizing interference between the set screw 150 and the shim 120 and a distance from a center of the cutting insert 130 to set screw 150. A wrench hole 117 is formed in the top of the shank 110. The wrench hole 117 serves as a hole to which a wrench is inserted to move the set screw 150 upwardly or downwardly. The wrench hole 117 is positioned coaxially with the screw hole 116. The screw hole 116 includes an axial extension portion 116a (see a dashed line shown in FIG. 3) in which a screw head 151 of the set screw 150 is situated. As shown in FIG. 3, the axial extension portion 116a of the screw hole 116 is disposed such that at least a portion thereof overlaps with the base wall 112 of the insert pocket 111. That is, when viewed from the top of the cutting tool assembly 100, the set screw 150 is disposed such that at least a portion thereof overlaps with the cutting insert 130, thereby reducing the distance from the center of the cutting insert 130 to the set screw 150.

The shim 120 is disposed on the base wall 112 of the insert pocket 111. The shim 120 prevents the slip of the cutting insert 130 in the insert pocket 111 and absorbs an impact force and a pressing force applied to the cutting insert 130. The shim 120 includes: an upper surface 121; a lower surface 127; side surfaces 122 which are located between the upper surface 121 and the lower surface 127; and a shim bore 123 which extending through the upper surface 121 and the lower surface 127. The shim bore 123 includes an inclined portion 124, which has a diameter gradually decreasing downwardly from the upper surface 121, and an extension portion 125, which extends from a lower end of the inclined portion 124 and has a uniform diameter.

The shim 120 may have a rhombus shape which is similar to the shape of the cutting insert 130. The shim 120 includes an avoiding portion 126 which is configured to reduce the distance from the center of the insert bore 135 to the screw hole 116 and to avoid interference with the screw head 151. The avoiding portion 126 includes at least one recess formed in the shim's peripheral side surface. By way of an example, as shown in FIG. 5, the avoiding portion 126 may include a pair of concave surfaces 126a, 126b and a convex surface 126c, which constitute a portion of the side surface 122 of the shim 120. The pair of the concave surfaces 126a, 126b and the convex surface 126c are located at a portion in a longitudinal direction LDS of the shim 120 or at an end portion in the longitudinal direction LDS of the shim 120. The pair of the concave surfaces 126a, 126b are formed opposite to each other in the side surface 122 of the shim 120, and the convex surface 126c is located between the concave surfaces 126a, 126b. The concave surfaces 126a, 126b and the convex surface 126c are perpendicular to both the upper surface 121 and the lower surface 127 of the shim 120. When the set screw 150 is mounted to the shank 110, the screw head 151 of the set screw 150 is positioned at the concave surface 126a, avoiding the interference between the set screw 150 and the shim 120. By way of another example, as shown in FIG. 6, the shim 220 has a rhombus shape similar to the shape of the cutting insert 130. The avoiding portion 226 may include a pair of concave portions 226a, 226b which are located at a portion in the longitudinal direction LDS of the shim 220 or adjacent to an end portion in the longitudinal direction LDS of the shim 120. The pair of the concave portions 226a, 226b may be formed symmetrically relative to the longitudinal direction LDS of the shim 220. The concave portions 226a, 226b are perpendicular to both the upper surface 121 and the lower surface 127 of the shim 220. When the set screw 150 is mounted to the shank 110, the screw head 151 is positioned at the concave portion 226a, avoiding the interference between the set screw 150 and the shim 220. Although the screw head 151 of the set screw 150 may be positioned at any one of the pair of the concave surfaces 126a, 126b or any one of the pair of the concave portions 226a, 226b, the avoiding portion includes the pair of the concave surfaces 126a, 126b or the pair of the concave portions 226a, 226b so that the cutting insert 130 can be uniformly supported with respect to the longitudinal direction LDS of the shim 120, 220.

The cutting insert 130 is a V-type cutting insert. As shown in FIG. 7, the cutting insert 130 has a planar shape of a rhombus, which has an included angle of 35 degrees at either corner in the longitudinal direction LDI of the cutting insert 130. The cutting insert 130 includes: an upper surface 131 having a rhombus shape; a lower surface 138 (see FIGS. 11 and 12) having a rhombus shape; four side surfaces 132 (only two side surfaces are shown in FIG. 7) located between the upper surface 131 and the lower surface 138; and eight cutting edges 133, 134 (only six cutting edges are shown in FIG. 7). The lower surface 138 has the same shape and configuration as the shape and configuration of the upper surface 131 and is mirror symmetric with respect to the upper surface 131. The side surfaces 132 are perpendicular to both the upper surface 131 and the lower surface 138. The four cutting edges 133 are formed between the upper surface 131 and the four side surfaces 132 (only two side surfaces are shown in FIG. 7), the four cutting edges 134 are formed between the lower surface 138 and the four side surfaces 132 (only two of the cutting edges between the lower surface and the side surfaces are shown in FIG. 7). Eight cutting edges 133, 134 formed in a single cutting insert 130 are used for cutting operation, increasing the service life of the cutting insert 130.

An insert bore 135, which extends through the upper surface 131 and the lower surface 138, is formed at a center of the cutting insert 130. As shown in FIG. 11, the insert bore 135 includes an upper inclined inner peripheral surface 136, which has a diameter gradually decreasing downwardly from the upper surface 131, and a lower inclined inner peripheral surface 137, which has a diameter gradually decreasing upwardly from the lower surface 138. When the cutting insert 130 is mounted to the insert pocket 111 with the upper surface 131 facing upwardly, the upper inclined inner peripheral surface 136 comes into contact with an inclined pressing surface 144a of the clamping head 144. In contrast, when the cutting insert 130 is mounted to the insert pocket 111 with the lower surface 138 facing upwardly, the lower inclined inner peripheral surface 137 comes into contact with the inclined pressing surface 144a of the clamping head 144.

The clamping lever 140 is an L-shape and is disposed in the lever receiving portion 115. The clamping lever 140 is received in the lever receiving portion 115 to clamp the cutting insert 130 to the insert pocket 111. As shown in FIG. 8, the clamping lever 140 includes a first extension portion 141, a second extension portion 142 and a supporting portion 143.

The first extension portion 141 is positioned nearly perpendicular to the base wall 112 of the insert pocket 111. The first extension portion 141 includes a clamping head 144 which protrudes from the top of the first extension portion 141 in the same direction as the extending direction of the second extension portion 142. The clamping head 144 presses the cutting insert 130 in the protruding direction of the clamping head 144. The clamping head 144 includes an inclined pressing surface 144a which is inclined downwardly from the top end of the clamping head 144 to press the cutting insert 130 in the directions perpendicular to and parallel with the base wall 112 of the insert pocket 111. As shown in FIG. 3, when the clamping lever 140 is received in the lever receiving portion 115, the protruding direction PD of the clamping head 144 has a predetermined angle with respect to the longitudinal direction LDI of the cutting insert 130. This can reduce the distance from the first extension portion 141 to the set screw 150 when compared to the case where the protruding direction PD of the clamping head 144 and the longitudinal direction LDI of the cutting insert 130 have the same orientation. Thus, the clamping lever 140 can securely clamp the cutting insert 130.

The second extension portion 142 extends from the lower end of the first extension portion 141 nearly perpendicularly to the first extension portion 141 and is positioned nearly parallel to the base wall 112 of the insert pocket 111. The second extension portion 142 has an engaging portion 145, which engages an engaging groove 153 of the set screw 150, at the front end of the second extension portion 142. The engaging portion 145 includes an upper engaging surface 145a, which is inclined downwardly from the top of the engaging portion 145 with respect to the second extension portion 142, and a lower engaging surface 145b, which is inclined upwardly from the underside of the engaging portion 145 with respect to the second extension portion 142.

The supporting portion 143 protrudes in a direction opposite to the extending direction of the second extension portion 142 at a position where the first extension portion 141 and the second extension portion 142 are interconnected. The supporting portion 143 serves as a fulcrum (i.e., rotation center) when the clamping lever 140 is rotated. In this embodiment, the clamping lever 140 has the supporting portion 143. In some embodiment, a peripheral surface of the clamping lever 140 where the lower end of the first extension portion 141 and the rear end of the second extension portion 142 are interconnected may be chamfered or formed in a round shape.

As shown in FIG. 9, the set screw 150 includes a screw head 151, a threaded portion 152 and the engaging groove 153. The screw head 151 is located at an upper side of the set screw 150 and does not have a thread on its peripheral surface. The threaded portion 152 is located in a lower side of the set screw 150 and has a thread on its peripheral surface. An external diameter of the screw head 151 may be smaller than an external diameter of the threaded portion 152. Thus, an interference region between the screw head 151 and the shim 120 can be reduced and the distance between the first extension portion 141 of the clamping lever 140 and the set screw 150 (i.e., the length of the second extension portion 142) can be reduced. As a result, the strength of the clamping lever 140 can be prevented from weakening.

The engaging groove 153 is formed between the screw head 151 and the threaded portion 152. An external diameter of the engaging groove 153 is smaller than the external diameters of the screw head 151 and the threaded portion 152. The engaging groove 153 includes: a cylindrical portion 153a having a uniform external diameter; a first tapered portion 153b formed between the screw head 151 and the cylindrical portion 153a; and a second tapered portion 153c (see FIG. 12) formed between the cylindrical portion 153a and the threaded portion 152. An external diameter of the first tapered portion 153b gradually decreases from the screw head 151 toward the cylindrical portion 153a, while an external diameter of the second tapered portion 153c gradually decreases from the threaded portion 152 toward the cylindrical portion 153a. As the set screw 150 is moved downwardly from above, the first tapered portion 153b is brought into contact with the upper engaging surface 145a of the engaging portion 145, thus rotating the clamping lever 140 in a clockwise direction by a predetermined angle about the supporting portion 143. In contrast, as the set screw 150 is moved upwardly from below, the second tapered portion 153c is brought into contact with the lower engaging surface 145b of the engaging portion 145, thus rotating the clamping lever 140 in a counterclockwise direction by a predetermined angle about the supporting portion 143.

The set screw 150 includes a first wrench insertion hole 154, which is formed in a lower end of the threaded portion 152, and a second wrench insertion hole 155, which is formed in an upper end of the screw head 151. For example, when the set screw 150 is initially fastened to the screw hole 116 from the bottom of the shank 110, the first wrench insertion hole 154 is used. After the set screw 150 is initially fastened, the clamping lever 140 can be rotated in the clockwise direction or the counterclockwise direction by moving the set screw 150 by means of the second wrench insertion hole 155. In this embodiment, the first and second wrench insertion holes 154, 155 are formed in the upper end of the screw head 151 and the lower end of the threaded portion 152, respectively. In some embodiment, the wrench insertion hole may be formed in any one of the upper end of the screw head 151 and the lower end of the threaded portion 152.

The cutting tool assembly 100 according to one embodiment may further include a shim pin 160 which is mounted to the lever receiving portion 115 and the shim bore 123. As shown in FIG. 10, the shim pin 160 has an approximately U-shaped or C-shaped cross-section and has a shape that a funnel is bisected vertically. The shim pin 160 includes an inclined portion 161, which has a diameter gradually decreasing downwardly from above, and an extension portion 162, which extends from a lower end of the inclined portion 161 with a uniform diameter. The shim pin 160 may be longer than a thickness of the shim 120 so that the shim 120 can be fixed to the lever receiving portion 115. Referring to FIG. 11, the inclined portion 161 of the shim pin 160 is placed on the inclined portion 124 of the shim 120. Further, a portion of an outer peripheral surface of the extension portion 162 is in contact with the inner peripheral surface of the extension portion 125 of the shim bore 123, while the rest of the outer peripheral surface of the extension portion 162 is in contact with the inner peripheral surface of the lever receiving portion 115 in the other portion. Thus, the shim 120 can be fixed to the lever receiving portion 115. Further, at least a portion of the inner peripheral surface of the extension portion 162 is at least partially in contact with the first extension portion 141 of the clamping lever 140, reducing a gap between the clamping lever 140 and the lever receiving portion 115.

Referring to FIG. 12, descriptions are made as to an example where the cutting insert 130 is mounted to the insert pocket 111 of the shank 110. First, the set screw 150 is fastened to the screw hole 116 of the shake 110 from below. The clamping lever 140 is inserted to the lever receiving portion 115 and the engaging portion 145 of the clamping lever 140 is positioned in the engaging groove 153 of the set screw 150. The shim 120 is placed on the insert pocket 111 such that the clamping lever 140 passes through the shim bore 123. A portion of the shim pin 160 is fitted to the shim bore 123, while the rest of the shim pin 160 passes through the shim bore 123 and is fitted to the lever receiving portion 115. The cutting insert 130 is placed on the upper surface 121 of the shim 120 such that the clamping lever 140 passes through the insert bore 135. Thereafter, as the set screw 150 is rotated and moved downwardly, the engaging portion 145 of the clamping lever 140 is brought into engagement with the engaging groove 153 of the set screw 150. At this time, the upper engaging surface 145a of the engaging portion 145 comes into contact with the first tapered portion 153b of the engaging groove 153, thereby transferring a force caused by the movement of the set screw 150 to the clamping lever 140. Then, the clamping lever 140 is rotated in the clockwise direction by the predetermined angle about the supporting portion 143 and thus the inclined pressing surface 144a of the clamping head 144 comes into contact with the upper inclined inner peripheral surface 136 of the insert bore 135. As a result, the clamping head 144 presses the upper inclined inner peripheral surface 136 in the directions perpendicular to and parallel with the base wall 112 of the insert pocket 111, thus securely clamping the cutting insert 130.

Descriptions are made as to an example where the cutting insert 130 is demounted from the insert pocket 111 of the shank 110 to change the position of the cutting insert 130 or replace the cutting insert 130. First, the set screw 150 is rotated and moved upwardly. As the set screw 150 is moved upwardly, the upper engaging surface 145a of the engaging portion 145 is disengaged from the first tapered portion 153b of the engaging groove 153. Further, as the set screw 150 is moved further upwardly, the second tapered portion 153c of the engaging groove 153 presses the lower engaging surface 145b of the engaging portion 145. As a result, the clamping lever 140 is rotated in the counterclockwise direction by the predetermined angle about the supporting portion 143 and the inclined pressing surface 144a of the clamping head 144 is separated from the upper inclined inner peripheral surface 136 of the insert bore 135. Thereafter, the cutting insert 130 can be demounted from the insert pocket 111 of the shank 110.

While the present invention has been described hereinbefore with reference to the foregoing embodiments depicted in the accompanying drawings, the present invention should not be limited thereto. It will be apparent to those of ordinary skill in the art that various substitutions, alternations or modifications may be made without departing from the scope of the present invention.

The invention claimed is:

1. A cutting tool assembly, comprising:
a shank including an insert pocket formed from a top and having a base wall, a lever receiving portion formed downwardly from the base wall, and a screw hole disposed perpendicularly to the base wall and formed upwardly from a bottom of the shank;
a shim disposed on the base wall of the insert pocket and including a shim bore extending through centers of an upper surface and a lower surface;
a cutting insert disposed on the upper surface of the shim and having a rhombus shape, the cutting insert including an upper surface, a lower surface, a plurality of side surfaces located between the upper surface and the lower surface, and an insert bore extending through centers of the upper surface and the lower surface;
a clamping lever received in the lever receiving portion, the clamping lever including a first extension portion disposed perpendicularly to the base wall of the insert pocket and a second extension portion extending from a lower end of the first extension portion parallel to the base wall of the insert pocket; and
a set screw fastened to the screw hole, the set screw including a screw head located upward, a threaded portion located downward, an engaging groove located between the screw head and the threaded portion and engaging a front end of the second extension portion,
wherein the shim includes an avoiding portion configured to avoid an interference with the screw head, the avoiding portion including at least one recess formed in a peripheral side surface of the shim.

2. The cutting tool assembly of claim 1, wherein the avoiding portion includes:
a pair of concave surfaces located at a portion in a longitudinal direction of the shim and formed opposite each other in a side surface of the shim; and
a convex surface located between the pair of concave surfaces.

3. The cutting tool assembly of claim 1,
wherein the upper surface and the lower surface of the shim have a rhombus shape, and
wherein the avoiding portion includes a pair of concave portions located at a portion in a longitudinal direction of the shim and formed opposite each other in a side surface of the shim.

4. The cutting tool assembly of claim 1, wherein the first extension portion includes a clamping head protruding in the same direction as the second extension portion.

5. The cutting tool assembly of claim 4,
wherein the insert bore includes an inclined inner peripheral surface having a diameter decreasing from the upper surface of the cutting insert toward the lower surface of the cutting insert, and
wherein the clamping head includes an inclined pressing surface inclined downwardly from an upper end of the clamping head.

6. The cutting tool assembly of claim 1, wherein the second extension portion includes an engaging portion formed at a front end of the second extension portion and engaging the engaging groove of the set screw.

7. The cutting tool assembly of claim 6, wherein the engaging portion includes:
a first inclined engaging surface inclined downwardly from a top of the second extension portion; and
a second inclined engaging surface inclined upwardly from a bottom of the second extension portion.

8. The cutting tool assembly of claim 7, wherein the engaging groove includes:
a first tapered portion contacting the first inclined engaging surface and having a diameter decreasing downwardly from the screw head; and
a second tapered portion contacting the second inclined engaging surface and having a diameter decreasing upwardly from the threaded portion.

9. The cutting tool assembly of claim 1, further comprising a shim pin passing through the shim bore and being fitted to the lever receiving portion.

10. The cutting tool assembly of claim 9,
wherein the shim bore includes an inclined portion having a diameter decreasing downwardly from the upper surface of the shim,
wherein the shim pin includes:
an inclined portion engaging the inclined portion of the shim bore and having a diameter decreasing downwardly from above; and
an extension portion extending from a lower end of the inclined portion of the shim pin with a uniform diameter, the extension portion passing through the shim bore and fitted to the lever receiving portion.

11. The cutting tool assembly of claim 1,
wherein the screw hole includes an axial extension portion at which the screw head is positioned, and
wherein the axial extension portion partially overlaps with the base wall of the insert pocket.

12. The cutting tool assembly of claim 1, wherein the clamping lever includes a supporting portion protruding in a direction opposite to an extending direction of the second extension portion at a position where the first extension portion and the second extension portion are interconnected.

13. The cutting tool assembly of claim 1, wherein:
the shim's upper and lower surfaces are connected by a side surface;
the shim's upper and lower surface have a rhombus shape with a longitudinal direction established between diagonally opposite shim ends;
the shim avoiding portion is symmetric about the longitudinal direction and comprises:
   (a) at one shim end, a pair of concave surfaces formed in the side surface on opposite sides of the longitudinal direction, and a convex surface located between the pair of concave surfaces, or
   (b) between the shim bore and one shim end, a pair of concave portions formed in the side surface on opposite sides of the longitudinal direction; and
the screw head of the set screw is positioned in one of the concave surfaces or one of the concave portions, thereby avoiding interference with the shim.

14. A cutting tool assembly, comprising:
a shank including an insert pocket formed from a top and having a base wall, a lever receiving portion formed downwardly from the base wall, and a screw hole disposed perpendicularly to the base wall and formed upwardly from a bottom of the shank;
a cutting insert disposed on the base wall of the insert pocket and having a rhombus shape;
a clamping lever received in the lever receiving portion, the clamping lever including a first extension portion disposed perpendicularly to the base wall of the insert pocket and a second extension portion extending from a lower end of the first extension portion parallel to the base wall of the insert pocket; and
a set screw fastened to the screw hole, the set screw including a screw head located upward and a threaded portion located downward,
wherein a portion of the set screw overlaps with a portion of the cutting insert when the shank is viewed from top, and
wherein the set screw is fastened to the screw hole from the bottom of the shank.

15. The cutting tool assembly of claim 14, further comprising a shim disposed between the base wall of the insert pocket and the cutting insert.

16. The cutting tool assembly of claim 15, wherein:
the shim has upper and lower surfaces connected by a side surface, and a shim bore extending through the shim's upper and lower surfaces;
the shim's upper and lower surface have a rhombus shape with a longitudinal direction established between diagonally opposite shim end portions;
at one shim end portion, the shim includes an avoiding portion which is symmetric about the longitudinal direction, the avoiding portion including at least one recess formed in a peripheral side surface of the shim and comprising:
   (a) a pair of concave surfaces formed in the side surface on opposite sides of the longitudinal direction, and a convex surface located between the pair of concave surfaces, or
   (b) a pair of concave portions formed in the side surface on opposite sides of the longitudinal direction; and
the set screw has a screws head which is positioned in one of the concave surfaces or one of the concave portions.

17. A shank, comprising:
an insert pocket formed from a top and having a base wall;
a lever receiving portion formed downwardly from the base wall and receiving an L-shaped clamping lever; and
a screw hole to which a set screw is fastened, the screw hole being disposed perpendicularly to the base wall and formed upwardly from a bottom of the shank;
wherein the set screw comprises a screw head connected to a threaded portion via an intermediate portion, an external diameter of the screw head being smaller than an external diameter of the threaded portion;
wherein the screw hole is located below the base wall of the insert pocket, and
wherein a portion of the screw hole overlaps with a portion of the insert pocket when the shank is viewed from top.

18. The shank of claim 17, wherein the insert pocket includes lower side walls contacting side surfaces of a shim.

19. The shank of claim 17, further comprising:
a shim disposed on the base wall of the insert pocket;
wherein:
the shim has upper and lower surfaces connected by a side surface, and a shim bore extending through the shim's upper and lower surfaces;
the shim's upper and lower surface have a rhombus shape with a longitudinal direction established between diagonally opposite shim end portions;
at one shim end portion, the shim includes an avoiding portion which is symmetric about the longitudinal direction, the avoiding portion including at least one recess formed in a peripheral side surface of the shim and comprising:
   (a) a pair of concave surfaces formed in the side surface on opposite sides of the longitudinal direction, and a convex surface located between the pair of concave surfaces, or
   (b) a pair of concave portions formed in the side surface on opposite sides of the longitudinal direction; and
the set screw has a screws head which is positioned in one of the concave surfaces or one of the concave portions.

20. A shank, comprising:
an insert pocket formed from a top and having a base wall;
a lever receiving portion formed downwardly from the base wall and receiving an L-shaped clamping lever; and
a screw hole to which a set screw is fastened, the screw hole being disposed perpendicularly to the base wall and formed upwardly from a bottom of the shank;
wherein:
the screw hole is located below the base wall of the insert pocket;
a portion of the screw hole overlaps with a portion of the insert pocket when the shank is viewed from top;
the insert pocket includes lower side walls contacting side surfaces of a shim; and the lower side wall includes a convex surface protruding toward the side surface of the shim.

* * * * *